Figure 1:
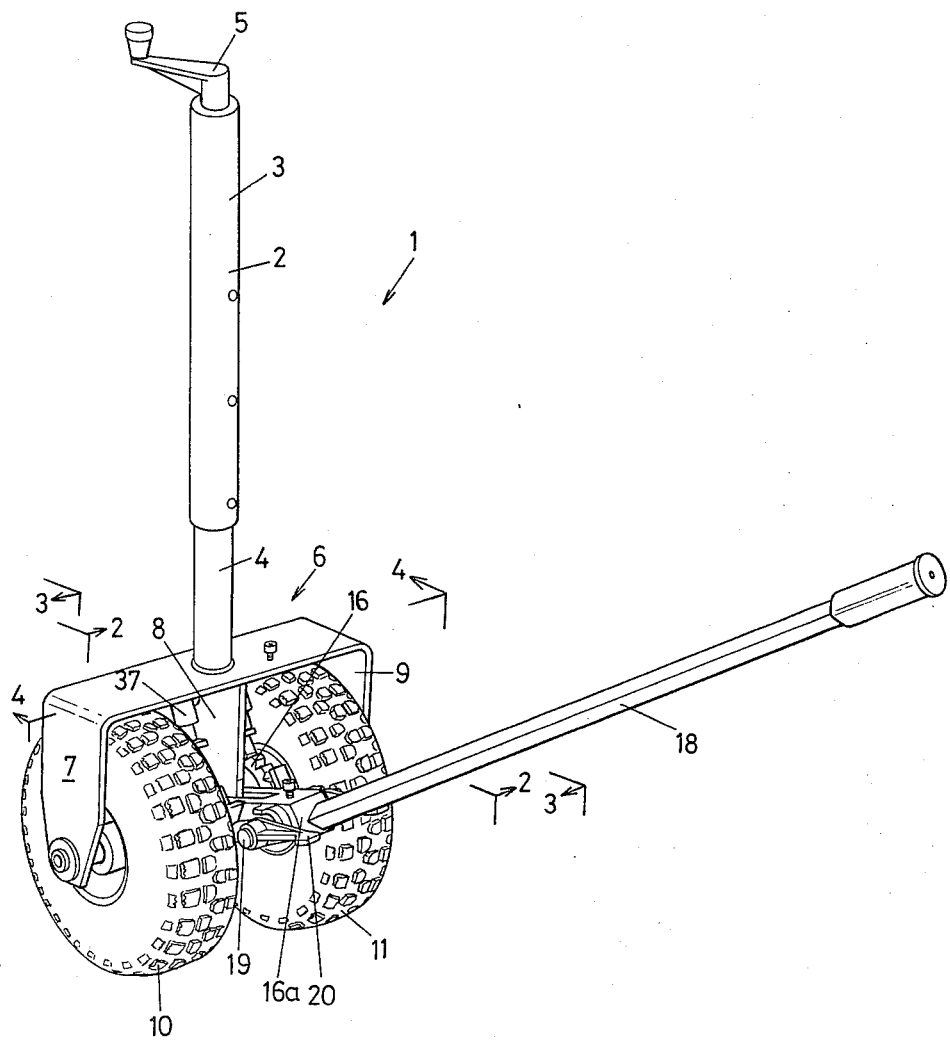

United States Patent [19]

Morris

[11] 4,227,706
[45] Oct. 14, 1980

[54] TRACTION DEVICES FOR TOWED VEHICLES

[76] Inventor: Lionel G. Morris, 17 Ferguson Ave., Myrtle Bank, South Australia 5064, Australia

[21] Appl. No.: 1,062

[22] Filed: Jan. 5, 1979

[30] Foreign Application Priority Data

Jan. 11, 1978 [AU] Australia .................... PD3008
Oct. 5, 1978 [AU] Australia .................... PD6242

[51] Int. Cl.³ ................................ B60K 9/00
[52] U.S. Cl. ........................... 280/3; 192/50
[58] Field of Search ............ 280/3; 74/157, 159; 192/43.1, 50

[56] References Cited

U.S. PATENT DOCUMENTS

| | | | |
|---|---|---|---|
| 2,531,819 | 11/1950 | Lewis | 192/50 |
| 3,269,740 | 8/1966 | Hutchinson | 280/3 |
| 3,549,161 | 12/1970 | Pusztay | 280/3 |
| 3,738,672 | 6/1973 | Dalton | 280/3 |
| 3,937,479 | 2/1976 | Dalton | 280/3 |

*Primary Examiner*—John J. Love
*Assistant Examiner*—Donn McGiehan
*Attorney, Agent, or Firm*—Oldham, Oldham, Hudak & Weber

[57] ABSTRACT

A traction device for caravans or trailers which is manually operated and includes a ratchet interconnection between the ground engageable wheel or wheels and a lever arm that is used to provide both a drive and a steering of the ground engageable wheels. In the case of two wheels ground engaging both the drive coupling and the general support is such that the wheels are differentially driveable and rotatable one with respect to the other.

5 Claims, 4 Drawing Figures

TRACTION DEVICES FOR TOWED VEHICLES

This invention relates to traction devices for towed vehicles especially traction devices of a type commonly known as jockey wheels and in which the traction can be effected through a device providing mechanical advantage so that the traction can be effected with manual effort.

The term "towed vehicles" refers to but is not limited to caravans and trailers normally passively towed by a motor vehicle.

BACKGROUND OF THE INVENTION

It has been known to provide a traction device in which a single wheel has been coupled in adjustable manner to a worm gear so that by rotation of the worm gear driving rotation of the ground engageable wheels can be effected with considerable mechanical advantage.

Problems have been experienced with such apparatus in that to a certain extent is is difficult to provide the correct gearing for every instance so that in one instance the gearing is too slow for effective operation and in another instance, for instance a large caravan up a steep slope, both traction and the gearing advantage may be too small.

It is also known to provide belts and cogs by which a ground engageable wheel can be driven with mechanical advantage but once again such an arrangement is both cumbersome and offers the same general problem as the worm drive in that it is difficult to provide any effective way of changing the gear ratios and also provide apparatus which is convenient and economic in use.

In another instance, to achieve additional traction. two wheels in co-axial arrangement have been proposed and driven by a common fixed worm drive connection, but such an arrangement is found to be extremely difficult to steer because there is no simple way in which a differential drive coupling can be effected for both wheels is such a system.

OBJECT OF THIS INVENTION

In general terms, the object of this invention is to propose an arrangement and a drive assembly which to some extend at least overcomes the problems hitherto experienced as above illustrated.

A further object of at least one aspect of this invention relates to providing a traction device which has improved traction and which in an economic way can provide differential drive action especially with the advantage of being very easily capable of providing good mechanical advantage if necessary or conversely a reasonably rapid rotational drive of the ground engageable wheels.

It is a further general object to provide such answers in a both economic and practical manner that can in fact be commercially sold within a price level that is acceptable to market demands in relation to the product having the stated capabilities.

STATEMENT OF THE INVENTION

The invention in one form can be said to reside in a traction device for towable vehicles of a type including an extendable stem adapted to be held to a draft frame, the stem supporting a frame holding at least two ground engageable wheels, and drive means to rotate at least one of the wheels, the arrangement is characterised according to this invention in that the said drive means comprise a lever arm pivotally secured relative to the frame, a ratchet supported by the arm so as to be movable with respect to the arm and engageable in ratchet manner with respect to the wheel, the ratchet being adjustably supported so that in one position of the ratchet, an oscillatory movement of the lever arm about its pivot support will result in rotation of the wheel around in one direction, and with the ratchet in the second position such oscillatory movement of the lever arm will result in rotation of the wheel around in an opposite direction to the first said direction, the lever arm being thereby effective to both steer the ground engageable wheel and effecting a drive rotation of the ground engageable wheel.

It has been discovered indeed that simply by having a ratchet connection to the ground engageable wheel, the degree of mechanical advantage available depends upon the length of the lever arm, and indeed the position that one will hold the lever arm distant from its pivot support, so that if one wants significant mechanical advantage, one holds the lever arm at its most distant location to get best mechanical leverage, whereas for rapid action, holding the lever arm closer to its pivot support will enable such quicker action to be available.

The lever arm can at the same time be used to steer the ground engageable wheels and this then provides the possibility of a very economic and indeed very practical answer to the problem in the most general sense.

A difficulty that has been experienced is the degree of traction available and this has been found to be significantly increased if there are two ground engageable wheels and especially where these are co-axially supported but there is the obvious difficulty of a differential drive effect.

Once again, this is taken care of in a most effective and economical manner by providing the said ratchet connection for each of the said wheels, allowing of course that each of the wheels are separately differentially rotatable about their central axis.

While of course there can be a lever arm associated with each of the drive mechanisms, it has been found not necessary and in fact it is far more desirable that the lever arm be common to two drives that is one for each wheel.

One of the difficulties having only one ratchet connection is that if for any reason a person is moving the towed vehicle up an incline, it is somewhat difficult to stop to caravan moving back against the ratchet when another bite of the ratchet tongues is wanted, and it has been found therefore, that it be an important feature to provide a second ratchet in each drive means which is supported relative to the frame and has at least two operating positions, one of which causes the ratchet to engage in ratchet manner with respect to the wheel so that rotation of the wheel about its central axis is inhibited in one direction and the other which causes the rotational direction in an opposite direction of the wheel about its central axis to be inhibited.

It has not been clearly expressed hitherto whether the ratchet engages some specific portion of a wheel or an attachment to the wheel, but it is found preferable to provide a cog which is in fact secured co-axially with respect to the wheel which has an outer peripheral surface with a number of teeth against which the ratchet can engage.

There have been some problems with respect to providing a good ratchet system which is both visually good and functional in operation as well as being economical for manufacture and accordingly, there has been provided in this case a ratchet arrangement which includes a spring loaded plunger supported by a pivotally adjusted control arm, and a ratchet member pivotally supported and including two engaging tongues positioned to, in one position, engage with one tongue the respective cog to effect respective ratchet action in one rotational direction, and, in a second position, to engage with the other tongue, the respective cog to effect the respective ratchet action in a reverse rotational direction, the ratchet member including a track and the plunger adapted to engage and slide along the track to hold the ratchet member in either of the two said positions to resiliently hold the respective tongue in a ratcheting position against the cog.

A significant problem has been experienced in having a frame which is not so heavy as to make the all up weight of the device difficult to carry and yet, be a device which is capable of shifting very large caravans, for instance.

One of the problems with a lever arm of considerable length as this is expected to be the case, is that considerable forces can be exerted with respect to the various portions of the frame and it has been found a quite important feature that the lever arm and the respective ratchets operate to act therefore symetrically above a central vertical axis about which the whole assembly can rotate.

To effect this, the frame provides three downwardly extending legs and a first of the ground engageable wheels is positioned between a first and second of the legs and a second ground engaging wheel is positioned between the second and third of the legs, and the lever arm is supported in a pivotal manner by the said second leg.

The invention could also reside in a combination of a towable vehicle with respect to any traction device having the above characteristics.

In another form, the invention could be said to reside in apparatus consisting the manual moving of a towable vehicle of the type generally described, especially being characterised in that there are two ground engaging wheels co-axially supported and differentially rotatable one with respect to the other about a supporting axle, and drive means coupled to each wheel to effect a separate drive action to each wheel and such that the wheels can differentially rotate about their supporting central axis to assist in rotation of the assembly about a vertical axis and therefore the direction of movement of the apparatus.

Figure 2:
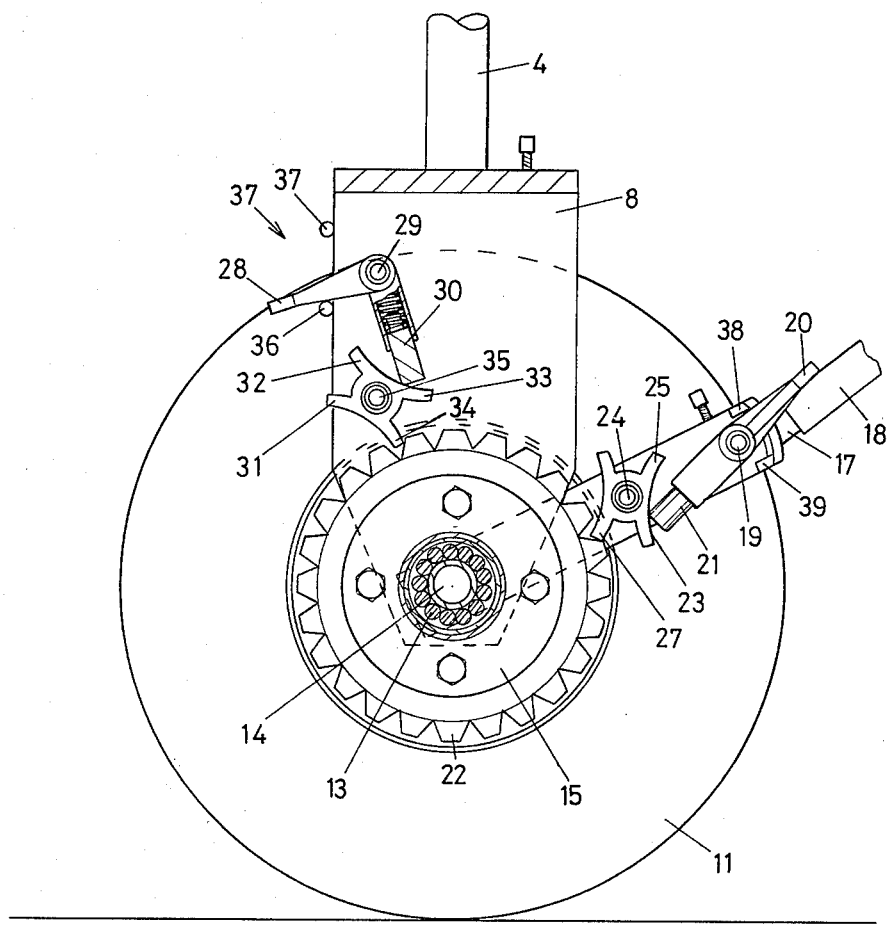
Figure 3:
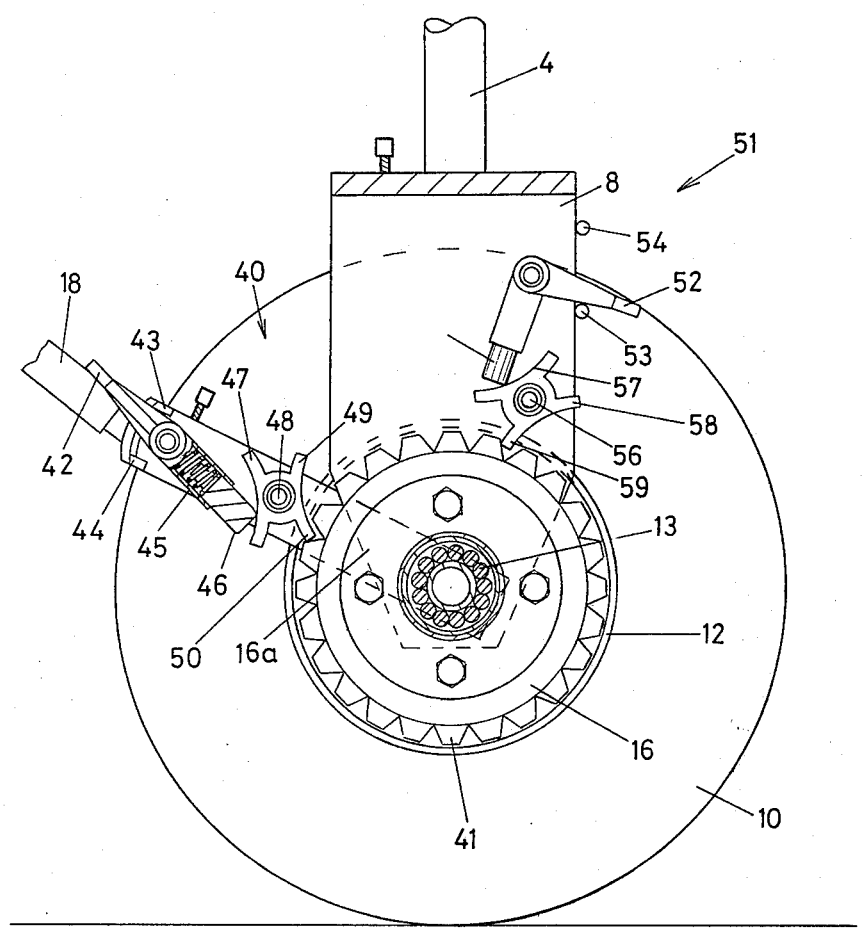
Figure 4:
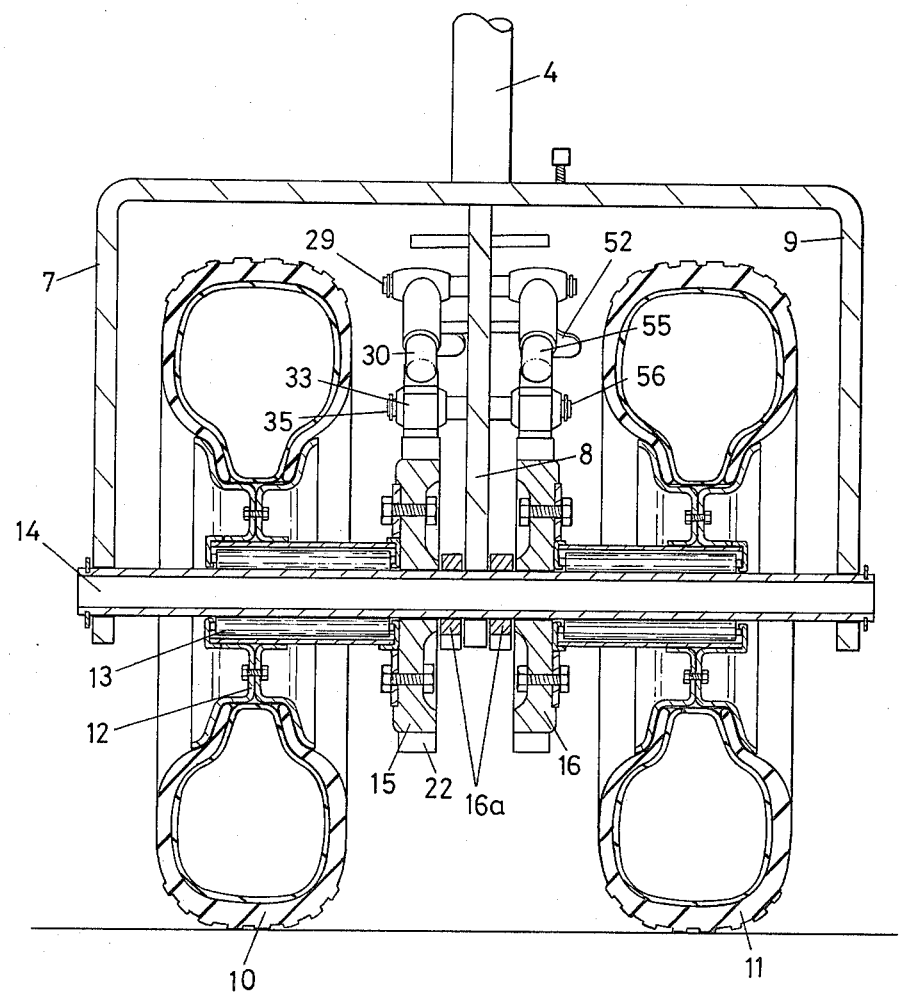

The invention will be better understood with reference to the preferred embodiment which shall be described with the assistance of drawings in which:

FIG. 1 is a perspective view of the preferred embodiment showing the lever arm drive and steering member in an operative position, FIG. 2 is a side elevation along the lines 2:2 as shown in FIG. 1 especially showing the cog and the coupling of the several ratchet means with respect to the cog, FIG. 3 is a cross sectional view along the lines 3:3 as shown in FIG. 1 this of course being the other side, but also showing in part cut-away cross section details of the spring loading of each plunger effecting the ratchet mechanism, and FIG. 4 is a cross sectional view along the lines 4:4 as shown in FIG. 1.

Referring now in detail to the drawings, the traction device includes an extendable stem 2 which includes other casing 3 and a lower stem portion 4 and there is a screw threaded rod not shown attached at an upper end to the handle 5 which is rotated relative to a nut also not shown affixed to the lower end portion 4 by which upon the rotation of the handle 5 the outer casing 2 is raised.

The outer casing 2 is adapted to be secured by suitable clamps to the draft frame of a towable vehicle such as a caravan or trailer of some sort.

Supported so as to depend below the lower stem portion 4 and constituting a portion of the frame 6 are three downwardly extending legs 7, 8 and 9 the legs 7 and 9 are positioned outermost and the leg 8 is located midway between the two.

Supported between respectively legs 7 and 8 and 8 and 9 are pneumatically inflated wheels 10 and 11.

Each of the wheels is rotatably supported about its central axis by having a rim 12 supporting a roller bearing 13 which is relatively rotatable with respect to the shaft 14.

Secured also to the rim in each case is a cog 15 and in the case of the other wheel 16 which is therefore secured to rotate with the respective wheels and indeed relatively rotate with respect to the shaft 14.

The drive means include a yoke 16a rotatably supported about the shaft 14 and having at an outer end a spigot 17 onto which with a slidable fit is a lever arm 18.

Supported on each side of the yoke 16a is a ratchet assembly including a pivotally supported plunger assembly 19 with a control arm, the control arm being shown at 20 and the spring loaded plunger then shown at 21.

Interposed between the cog 15 and especially the peripheral teeth 22 is a ratchet member 23 which is pivotally supported on the yoke 16 by pivot axis 24 this being in what might be termed a generally star-shape and having at an outer edge a track 25 across which the plunger 21 may slide and provide a holding resiliently retained position so that respectively the teeth, either 26 or 27 can engage the said peripheral teeth 22 of the cog.

It will be seen that in one position as shown in FIG. 2 the cog can rotate in the clockwise direction but if by movement of the control arm 20 downwardly, then this will cause the plunger 21 to engage against the other side of the ratchet member 24 especially on the track 25 and this will cause the tooth 26 to come into operation and this will stop such rotation in the clockwise direction and more importantly perhaps ensure that upon oscillatory motion, that is a motion around the axis of shaft 14 by the arm 18 then this will cause the cog to rotate in the anti-clockwise direction.

This of course depends upon the complimentary position of the other ratchet assembly which will not be discussed.

The inhibiting ratchet assembly shown in general terms at 27 includes a control arm 28 an axially supported body at 29 and a spring loaded plunger at 30.

The ratchet member 31 includes an arcuate track 32 and inner teeth 33 and 34, the assembly being rotatably supported by the leg 8 by means of pivot support 35.

There is a stop member 36 and a further stop member 37.

It is to be noted that plunger assembly 19 also has stops 38 and 39.

It will now be seen that by the respective controlling position of the control arms 20 and 28 the rotational direction upon an oscillatory motion of the lever arm 18 about the axle 14 will result in the cog and therefore the respective wheel in the instance 10 being rotated in the appropriate direction and being inhibited from rotation in the opposite direction.

Referring specifically to FIG. 3 this shows the other cog and associated ratchet drive systems which are indeed the same as that shown in FIG. 2 although specifically the cog 16 has peripheral teeth 41.

The yoke 16a then has on its other side as shown in FIG. 3 a quite similar arrangement as is shown in FIG. 2 including the drive mechanism 40 acting against the teeth 41 of the cog in this case 16a, in the case of FIG. 3 however, the control arm 42 acting between stops 43 and 44 is shown partly cut away to show the helical spring 45 which presses down on the plunger 46 which acts on the track 47 of the ratchet member 48 which has the two teeth 49 and 50.

The inhibiting ratchet system 51 includes a control arm 52 pivotally supported to the central leg 8 and this operates between stops 53 and 54 and has a spring loaded plunger 55 acting against ratchet member 56 which once again has an arcuate path 57 fingers 58 and 59.

A most important feature of the preferred embodiment as described is the fact that the wheels 10 and 11 can differentially move even when being driven by the lever arm 18.

This ensures that in so far that the wheels are rotatable around a central vertical axis which is of course the axis of the stem 2 then at least one wheel will be able to move differentially with respect to the other and therefore not provide undue resistance to such gearing action.

It is of course implicit that the respective control arms of the inhibiting ratchet system or the drive ratchet systems are operated in unison, that is each in the same way so as to have consistent drive forces and inhibiting forces on the respective wheels but other than this, there is a single lever arm that operates both ratchet drive systems and this in turn drives in so far as the wheels are capable, any device such as a towable vehicle attached to the stem of the apparatus.

It is of course implicit that in the invention that while the extendable stem method of providing support for a draft frame for a caravan or trailer is presently the preferred method, this is only indicative of the type of apparatus that is preferred and any other device having a system of holding a draft frame and preferably having means to lift or lower the draft frame relative to the ground supporting wheels would seem to come within the concept of the broader concepts of this invention so far that they include the other features.

The drive system especially has the feature that if one wants to drive the wheels in a quick manner, then one can hold the lever arm somewhat closer and can very quickly and rapidly effect an up and down oscillatory motion for rapid drive.

Conversely, if the load is very heavy, a much slower action is available or perhaps more importantly a much longer lever arm is available if this is desired.

From what has now been seen, it will be appreciated that the invention as applied to the preferred embodiment indicates that this allows a very practical and very effective answer to the problems hitherto experienced.

We claim:

1. A traction device for a towable vehicle of a type including an extendable portion adapted to be held to a draft frame, the extendable portion engaging a frame holding two ground engageable wheels, and a pair of drive means each for individual engagement with a wheel to rotate the same, and including a lever arm means pivotally secured relative to the frame, the arrangement being characterised according to this invention in that the said drive means comprise in each case a ratchet supported by the lever arm means so as to be movable with respect to the arm and engageable in a ratchet manner with respect to the wheel, the ratchet being adjustably supported so that in one position of the ratchet, an oscillatory movement of the lever arm means about its pivot support will result in rotation of the wheel around in one direction and with the ratchet in a second position, such oscillatory movement of the lever arm means will result in rotation of the wheel around in opposite direction to the first said direction, the lever arm means being thereby effective to both steer the ground engageable wheel and effect a driving rotation and, each of the said wheels being differentially rotatable about its central axis.

2. A traction device for towable vehicles as in claim 1 in which there is as a further part of each of the said drive means, a second ratchet supported on the frame and having at least two operating positions, one of which causes the ratchet to engage in ratchet manner with respect to the wheels, so that rotation of the wheel about its central axis is inhibited in one direction, and the other of which causes the rotational direction in an opposite direction of the wheel about its central axis to be inhibited.

3. A traction device for towable vehicles as in claim 1 in which each said wheel includes a cog co-axially secured thereto, and each said ratchet engages with respect to its respective wheel its said cog.

4. A traction device for a towable vehicle of a type including an extendable portion adapted to be held to a draft frame, the extendable portion supporting a frame holding two ground engageable wheels, a common lever arm pivotally secured relative to the frame, and drive means to rotate the wheels, the arrangement being characterized according to this invention in that the said drive means comprise in each case a ratchet supported by the lever arm so as to be movable with respect to the arm and engageable in ratchet manner with respect to the wheel, the ratchet being adjustably supported so that in one position of the ratchet, an oscillatory movement of the lever arm about its pivot support will result in rotation of the wheel around in one direction and with the ratchet in a second position, such oscillatory movement of the lever arm will result in rotation of the wheel around in opposite direction to the first said direction, the lever arm being thereby effective to both steer the ground engageable wheel and effect a driving rotation;

each of the said wheels being differentially rotatable about its central axis and the drive means as characterised exists for each of the said wheels; and, the ratchet in each case including a spring loaded plunger supported by a pivotally adjustable control arm and a ratchet member pivotally supported and including two engaging tongues positioned to, in one position, engage with one tongue the respective wheel to effect the respective ratchet section in one rotational direction, and in a second position to engage with the other tongue the respective wheel to effect the respective ratchet action in a reverse rotational direction, the ratchet member including a track and the plunger being adapted to engage and slide along the track to hold the ratchet member in either of the two said positions to resiliently hold the respective tongue in a ratcheting position in respect to the wheel.

5. A traction device for towable vehicles as in claim 4 in which the frame includes 3 downwardly extending legs and a first of the ground engageable wheels being positioned between a first and second of the legs and a second ground engageable wheel being positioned between a second and third of the legs, and the lever arm means being supported in a pivotal manner on the said second leg.

* * * * *